Figure 1:
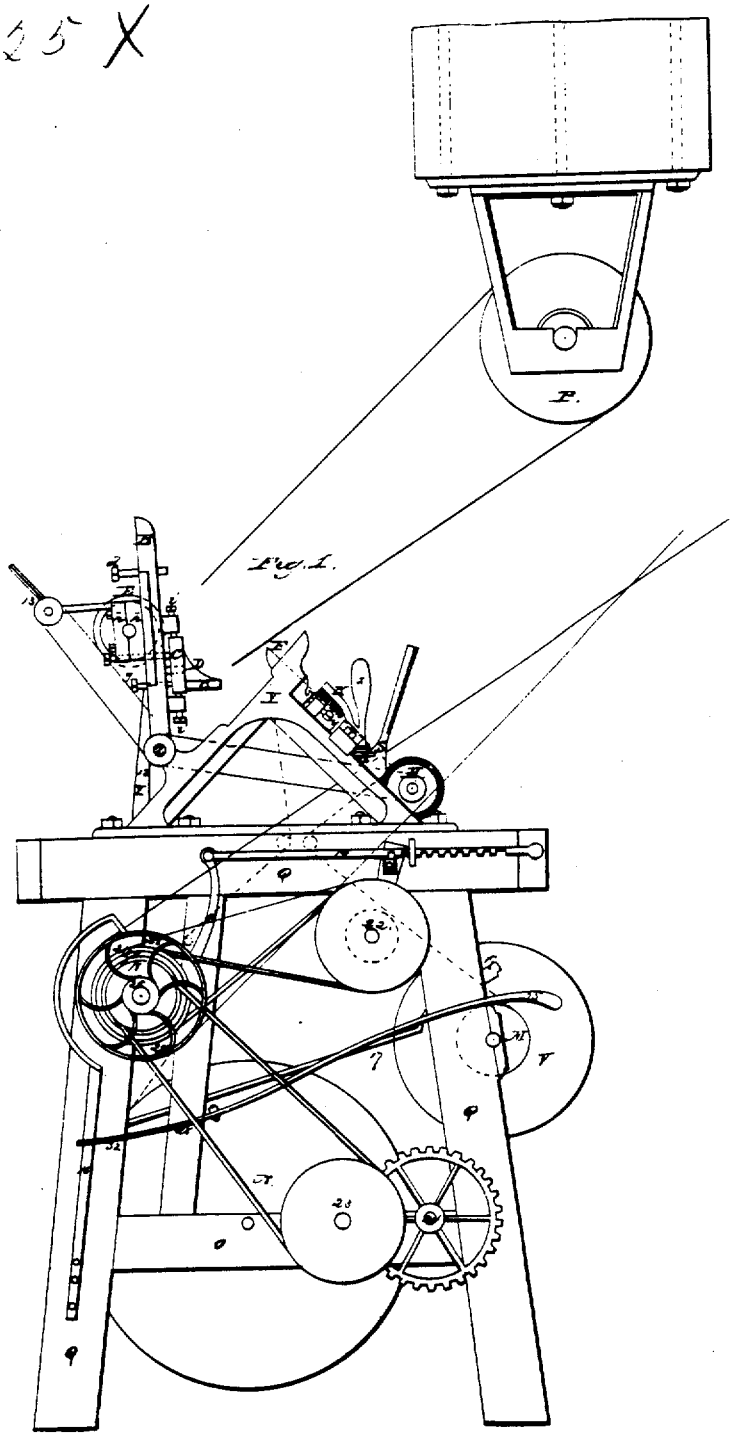
Figure 2:
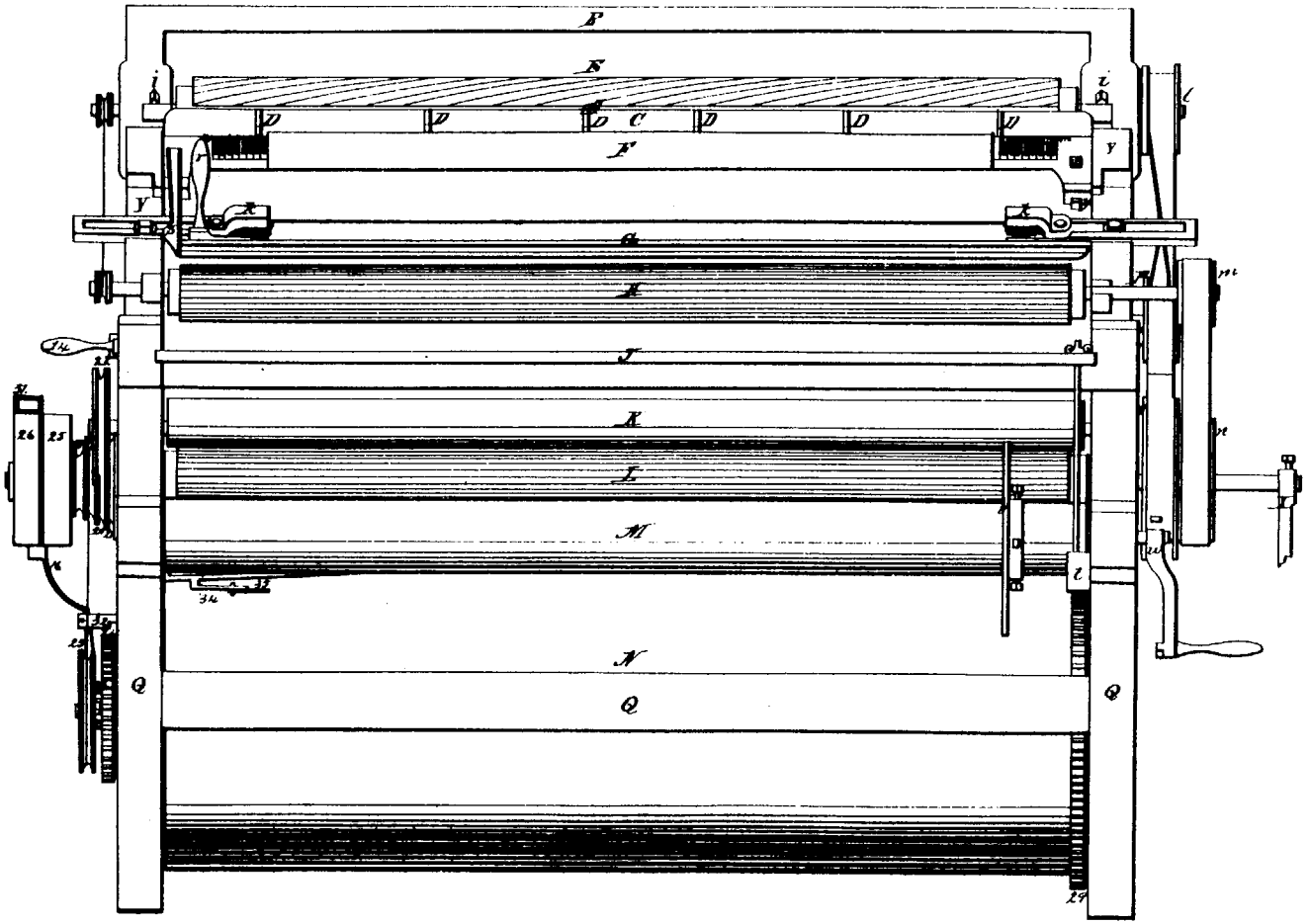
Figure 3:
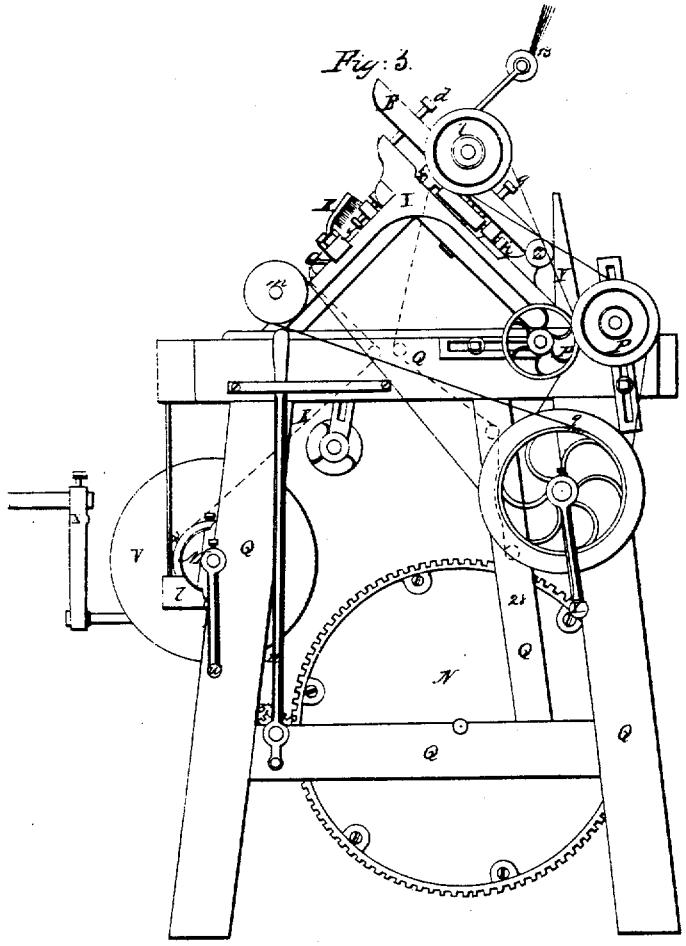
Figure 1:
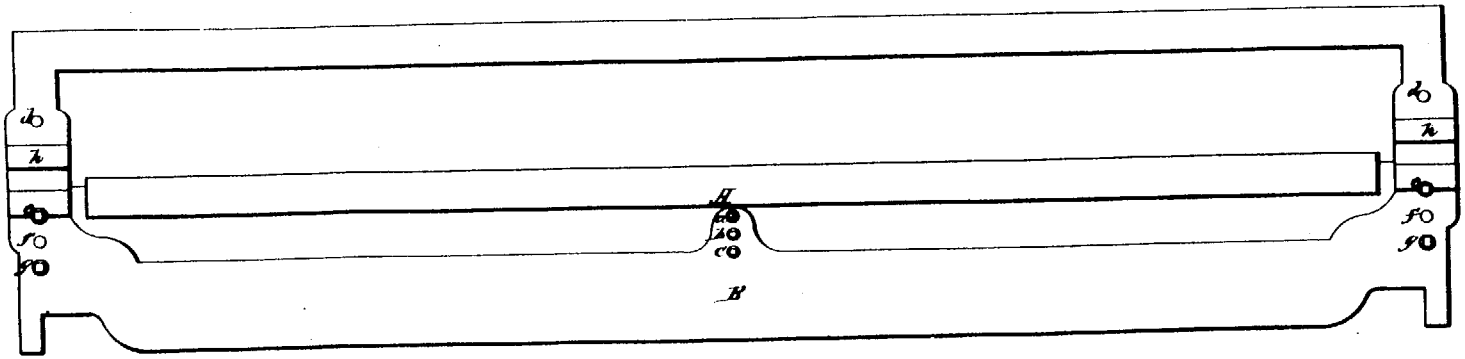
Figure 2:
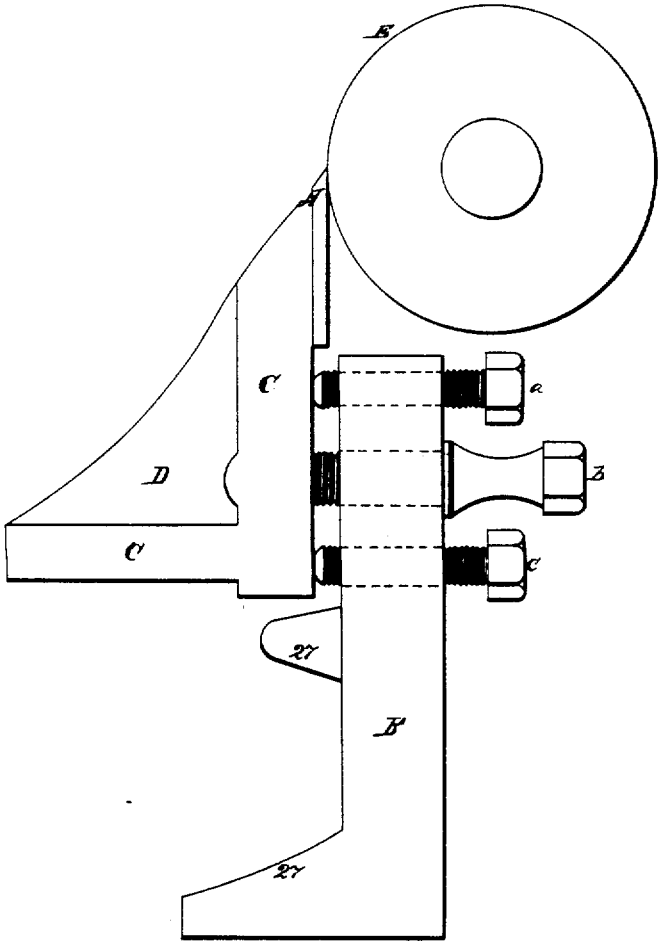

BEST AVAILABLE COPY

Sheet 1 - Plate 1.

J. Davison.

Cloth Shearing Mach.

Patented May 29, 1834.

5,225 X

H. RETERS, PHOTO-LITHOGRAPHER, WASHINGTON, D. C.

BEST AVAILABLE COPY

Sheet 2 - Plate 1.

5225X

J. Darison.
Cloth Shearing Mach.

Patented May 29, 1834

BEST AVAILABLE COPY

Sheet 3 - Plate 1.

8,225 X

J. Davison.

Cloth Shearing Mach.

Patented May 29, 1834.

N. PETERS, PHOTO-LITHOGRAPHER, WASHINGTON, D. C.

Sheet 1 - Plate 2.

J. Davison.

Cloth Shearing Mach.

BEST AVAILABLE COPY

Patented May 29, 1834.

8225X

N. PETERS, PHOTO-LITHOGRAPHER, WASHINGTON, D. C.

X225 X

Sheet 2 - Plate 2.

J. Davison.

BEST AVAILABLE COPY

Cloth Shearing Mach.

Patented May 29, 1834.

N. PETERS, PHOTO-LITHOGRAPHER, WASHINGTON, D. C.

May 29. 1834 8225X 161.

John Davidson, of Springfield, Vermont
Letters Patent

The schedule referred to in these Letters Patent and making part of the same containing a description in the words of the said John Davidson himself, of his improvement in the machinery and apparatus for shearing broad cloths.

---

To all to whom these presents shall come. John Davidson of Springfield, in the County of Windsor, and State of Vermont, mechanist sends greeting: Be it known that I the said Davidson have invented, made constructed, and applied to use, a new and useful improvement in the machinery and apparatus for shearing broad cloth, which I specify and describe as follows. That is to say the machine embracing my said improvement is represented as well as divers parts thereof, in the drawings hereto annexed, which are to be taken and considered as part of this specification. Fig. numbered one, in plate numbered one is an end view of the machine on the left hand, and figure numbered three, in the same plate, is an end view of the end of the machine on the right hand. figure numbered two in the same plate, is a front view of the same machine. figure numbered one, in plate numbered two, is a representation of the ledger, or stationary blade, and the bed and back to which it is affixed & the frame with which it is connected, & whereby it is supported. fig. numbered two, in the same plate is a sectional view of the same blade, bed and back, & frame, & the screws whereby the bed & back, & its blade, is firmly held in the middle thereof. The same parts of the machine, are designated by the same letters, or numbers in all the figures in both plates. The machine which I describe is one, which I have now in operation, and the form, dimensions, and proportions are given therefrom; but may be somewhat varied, at discretion, as a mechanist of ordinary skill will readily perceive. A designates the ledger blade, which is made of iron and steel, in the usual way of making such like cutlery, and is about two inches wide, and about five feet nine inches long, and about three sixteenths of an inch thick, and is firmly rivetted to a piece of cast iron, which forms the bed and back thereof and is designated by C. which with the cast iron frame designated by B. by which it is supported, serves to render the blade, stiff, firm, and unyielding.

8225X

The ledger blade laps over the piece of cast iron which forms the bed and back thereof, about five eighths of an inch. But it may be made to lap over more or less at discretion, so that the cloth is kept from touching the bed, and it may be wider or narrower, and thicker or thinner, at discretion, provided it be sufficiently thick, to be kept perfectly firm, and unyielding. The edge of this blade must be ground to resemble the edge of the blades of shears, or the edge of ledger blades, used in the shearing of cloth, and must also be perfectly straight, and even, so that it may be exactly and nicely adjusted to the spiral blades on the rotary cutter designated by E. The ledger blade, and the rotary cutter with its blades are nicely adapted and fitted to each other, by grinding them at first separate-ly, as even and straight as possible, and finally by grinding them together against each other, so that they may be exactly and perfectly fitted and adapted to each other — The piece of cast iron designated by C, to which the ledger blade is rivetted, is about six feet five inches in length, about seven eighths of an inch thick, and of the form represented by a section thereof, in the figure numbered two, in plate numbered, two — D,D &c designate braces which serve to render this bed, and back for the ledger blade more firm, and unyielding of which there are six, but they are cast with the bed and back in one solid piece of cast iron —

This bed and back may be made of wrought iron, composition metal, or metal of sufficient strength to hold and retain the ledger blade, and to keep it fixed, firm and unyielding. The piece of cast iron C. is fixed to the cast iron frame B. firmly at each end, and in the middle, by the screws designated by f.f.&b. The middle screw b. passes through one part of the frame B. and operates in C. and the end screws f.f. pass through the back C. and operate in the frame B. There is a slaught where the screws are in the ends in C. and in the middle in B. in order that the bed and back, and its ledger blade, may be moved back and forth when requisite to adjust the edge of the ledger blade, to the blades on the rotary cutter, and put and keep it in the requisite position, for operating with those blades, in cutting — The screws e.g. at the ends, & a.c. in the middle, pass through B, and operate on C, and assist in adjusting the ledger blade to the spiral blades on the rotary cutter, and also, in causing the bed and back C. with its blade c.t. to be steady, firm and unyielding, & to be kept so. The screws e.f.g. at the ends & a.b.c. in the middle must be in a line at right angles, with the edge of the ledger blade II. &c. designate screws at the ends of the bed and back of the ledger blade, to raise or depress it, with the ledger blade, and to assist in moving it, when required, and keeping it in a suitable position for cutting.–
B. designates the cast iron frame, for supporting the bed, and back, with its blade and the rotary cutter. It is about six feet and five inches long, and an inch and one eighth of an inch thick, and the lower part to which the back and bed, of the ledger blade is fastened, is about four inches and an half wide, and the upper part or bar for removing the frame, upon its pivots when required by the hand, is about two inches wide, and the ends of the frame, from the extremities, are about seventeen inches long, and two inches wide at one part of each, but wider at other parts, as represented in the figures numbered, one, in plate numbered two,–
The lower part to which the bed and back of the ledger blade is fastened, has parts projecting from it, designated by the figures 27. 27. to make it more stiff, strong, firm, and unyielding. I. designates the pivots at each end, on which the frame B is turned, when it is required to remove the rotary cutter, and ledger blade from, or carry them to the cloth upon the rest F.– The part of the cast iron frame V. designated by the figures 12. forms a brace or support, against which the iron frame B. rests, when it is raised up, with the ledger blade, & its bed & back, & the rotary cutter from the cloth on the rest F. this frame may be made of composition metal, or wrought iron, or any metal sufficiently stiff & firm, but cast iron is deemed preferable, as uniting stiffness, firmness, strength, lightness, & cheapness, as well for the bed and back of the blade, as for the frame B. The form and size of the frame B. and the bed and back C. may be somewhat varied at discretion, as any mechinist of ordinary skill will perceive, but they must be sufficiently large, to be firm, and unyielding, and adapted to hold and keep the ledger blade & rotary cutter, in a proper position for cutting & shearing, and the means of adjusting & fastening the blade with its bed & back to the frame, & the rotary cutter, & cloth to be operated upon may be somewhat varied but the means above described are deemed preferable.
It is indispensably necessary that the ledger blade, should be kept firm, and unyielding, and should be nicely & exactly adapted to the special blades on the rotary cutter. E. designates the rotary cutter, which has cast steel gudgeons, having bearings in composition boxes. h.h. confined firmly to the frame B. on the side opposite to that, on which the ledger blade is. The shaft of the rotary cutter is of wrought iron about three inches in diameter, and five feet and eleven inches long, having twelve spiral blades projecting beyond the shaft about half an inch, which are inserted in the shaft in the usual way. The shaft may be vairied as to its diameter or made hollow, and may be made of any metal not friable and sufficiently firm to hold the blades, but wrought iron is deemed preferable, and the shaft ought not to be much less in diameter, otherwise it will be liable to spring. The blades may project somewhat more or less, but the above projection is deemed best, and there ought to be, as many blades in the shaft, as there are quarters of an inch, in its diameter. It is indispensably necessary, that the rotary cutter should be kept firm, and unyielding, and that its blades should be nicely and exactly fitted, and adapted to the edge of the ledger blade, its relative position to which when in operation, is shewn in figure numbered two, in plate numbered two; on an extension of the gudgeon, at one end of the rotary cutter, is a pulley t, by a cross belt, which passes over one of the grinding pullies PP. and over the pulley q. On the end of the shaft of the large cylindrical brush S. and between said grinding pullies, and over the other of them. F. designates the rest for the cloth to be submitted to the operation of shearing over which rest, the cloth passes, which rest is made of cast iron, but may be made of any other suitable metal, sufficiently stiff and firm. It is fixed to the iron frames Y with screws at each end, by which it is raised, & lowered, and adjusted, and held firmly in its place. It is about six feet long, about four inches wide and about three fourths of an inch thick, except the upper edge which is about one sixteenth of an inch thick, and rounded, and made perfectly straight and even, so as to correspond with the rotary cutter and ledger blade, and has the under part of the bar, extending at a right angle from the other part, in form of a lip with three braces, somewhat like the piece of cast iron C. which forms the back and bed of the blade before described.

The form and size of this rest may however be varied somewhat at discretion, but the above is deemed preferable. On each end of this rest, there are slides, numbered 1. 2. 3. 4. 5. 6. 7. 8. 9. 10, with slonghts in them, and fastened by screws, so that they may be raised or lowered to adapt the length of the rest, to the width of the cloth, to be sheared, between the lists, and save the lists.

This rest should be brought within about an eighth of an inch of the ledger blade, or nearer, or more distant according to the thickness of the cloth to be

8825X sheared. d. designates a screw at each end, for regulating the distance of the rotary cutter, and ledger blade from the cloth to be sheared. k.k. are brushes to lay the nap upon the lists, so as to prevent the rotary cutter and ledger blade from operating upon it. These brushes are connected with slides, with a slought in them, so as to bring the brushes upon the lists, whether the cloth be wider or narrower. E. is another rest which keeps the cloth near to the brush for raising the nap so that this brush may operate upon it. This rest is fastened at each end by a screw to pieces of iron with a pivot on them, and a slought in them, so as to raise or lower the rest, and turns upon the pivots, and is turned up from and down to the cylindrical brush. H. by the handle, r, & is confined in its place whether up or down, by the springs. The upper side of the rest when in a position to have the cloth operated upon by the brush, should be brought in a line with the radius of the brush, and the under side is rounded off from the angle or corner near the brush _ This rest should be firm and stiff, so as not to yield by the pressure of the cloth upon it. H, represents the revolving cylindrical brush for raising the nap on the cloth to be sheared. It is six feet long, about four inches in diameter, and made in the usual way, with eighteen spiral rows of brushes, and turns on gudgeons in boxes, on the iron frames Y, and is driven by the pulley M. on the end of its gudgeon with a cross belt from pulley N. on the end of the shaft of the cylindrical brush L. (13) designates a wooden revolving roller with felt projecting from it to receive oil, by oiling the blades of the rotary cut-ter, and is caused to revolve by a band passing over a pulley on the end of the roller, and thence over a pulley on the end of the pivot Z. which last pulley is driven by another band which passes over a pulley on the end of the gudgeon of the cylindrical brush, H. J. designates a table six feet long to lay the cloth upon, while it is being put into the machine, or taken out therefrom. K. is a cylindrical scraper six feet long, consisting of a wooden roller with three pieces of iron, with round edges fixed into it, spirally, like the blades in the rotary cutter, to brush the flocks from the back side of the cloth and prevent them from collecting on the edge of the rest near to the ledger blade and rotary cutter. L. designates the cylindrical brush for laying the nap, which is six feet long and nine inches in diameter, but may be varied somewhat in size at discretion, and contains thirty-six rows of brushes in a spiral form, & turns on gudgeons in boxes, confined to the inside of the posts of the main frame 9. and
is driven by pulley numbered 25, next to the loose pulley 26. by a band which
passes over the drum P. The cloth passes under the roller 29, and over a crank
rest by which it is brought to this cylindrical brush for laying the nap to be
operated upon, and carried from it at pleasure by means of the lever and
slide 14. with a handle to it X, is a crank for turning the whole machine by
hand occasionally when necessary. M. designates the cloth beam roller of wood
with iron gudgeons, on which the cloth is first rolled or wound. W. is a crank
on the end of one of the gudgeons of this beam to turn it in order to wind the
cloth upon it. V is a head, against which the cloth on the beam is rolled or
wound. t, is a resister adapted to the cloth beam, and operated upon, by a rod
from the table, T, with a thumb nut, but it may be operated upon by a
weight, so as to prevent the cloth from being wound off faster, than is required
for shearing it. N, designates a drum six feet long, and twenty-two inches in
diameter, upon which the cloth is drawn, while in the process of being sheared.
Fastened to one end of the drum, is an iron gear two feet in diameter, which
meshes into a pinion, 37, on the shaft upon which is the gear wheel 24. which
meshes into the pinion 30. which pinion is driven by the pulley 23. which is
turned by a band from pulley 19. 20. 21. having different grooves to regulate
the speed of the drum. 16 is a spring in the upper end of which is a loop 31,
through which the main belt passes: through this spring the latch 32. connec-
-ted with the post in the main frame 9 passes. The lever 15. which turns upon
a pivot 33. serves to throw the spring up so as to bring the loop with the
main belt from the loose pulley 26. to and over the pulley 25. where it is
confined by the latch 32. to put and keep the machine in motion. 17 designates
a lever, which operates upon the inside end of the latch, to lift up the outer
end and let the spring 16 back with the belt over the loose pulley to stop
the machine. On the inside of the post, in front of the main frame 9. is a
piece of iron somewhat in the form of the letter tee, on which the lever 17
rests, and against they stem of which, the arm and slide 35. upon the spring
34., when the cloth is wound wholly off, from the arm and slide will strike,
and thereby throw up the lever and stop the machine. But this spring when
the cloth is wound upon the beam, is brought down into the slought made in the beam for receiving it, and the arm and slide connected with it is brought and kept down by the cloth, so as not to interfere with, or strike the stem of the tee, until the cloth is wound off from it, when it will rise and strike the stem and move the lever, and thereby throw up the latch and stop the machine. The slide 35. is made for the purpose of accommodating this part of the machinery to the width of the cloth. 11. designates the lever connected with the end of the gudgeon of the pinion wheel 27. for throwing the drum out of gear and stopping its motion. The cloth is wound on the cloth beam M. and from thence it passes under a carrying roller turning on gudgeons, in the front post of the main frame Q. near the scraper K. and thence over the scraper K. and thence under another roller turning on gudgeons, in the caps of the main frame Q. and thence to the rest E. near the cylindrical brush H, for raising the nap, and thence over the rest F. near the rotary cutter, and ledger blade to be sheared, and thence over another carrying roller in the caps of the frame Q. turning on gudgeons in said caps, and thence to the crank rest near the cylindrical brush L. for laying the nap, and by this brush under the roller 29. and thence to the drum on which it is wound by the motion of the machine, while the process of shearing is going on. A leader of any suitable cloth is to be fastened to the cloth beam, and another leader is also to be fastened to the drum, and one end of the cloth to be operated upon, is to be fastened to one leader and the other end, to the other leader, so that the nap, may be raised, the cloth sheared, and the nap laid at, and near the ends of the cloth as well, and conveniently, as in any other part of it.

Although I have described above the whole machine, embracing my said improvement, yet it is to be distinctly understood, that I do not claim the whole of the above described machines, or machinery as new, or of my invention. But what I claim as new, and as my invention, and as my said improvement, and all, which I claim as such, is, the construction, application, and use of such ledger blade as aforesaid with a metallic bed, and back fixed, and rendered stiff and firm, and unyielding, attached to a metallic frame, in connexion as aforesaid with such rotary cutter as aforesaid, and in combination therewith, for the purposes of shearing broad cloths from end to end. The great advantage of the above improved machine for shearing broad cloth is, that it will shear such cloth as well, and much faster, than the machines, now in common use for that purpose.

In testimony whereof I have hereunto set my hand and seal, this fifteenth day of February in the year of our Lord eighteen hundred and thirty-four.

Witnesses,

Augustus A. Fiske

Ben Rond

John Davidson

Exd.

M.G.L.

(3/28 words)

Drawing